Jan. 5, 1954

E. RENNIE ET AL 2,664,769

WIRE STRIPPER

Filed Sept. 12, 1950

ELWOOD RENNIE,
WILLIAM W. HYDE, DECEASED,  INVENTORS
JAMES H. HYDE, HIS EXECUTOR.

BY

Harry M. Saragovitz
Attorney

Patented Jan. 5, 1954

2,664,769

UNITED STATES PATENT OFFICE 2,664,769

WIRE STRIPPER

Elwood Rennie, Red Bank, and William W. Hyde, deceased, late of Eatontown, N. J., by James H. Hyde, executor, Mayetta, Kans., assignors to the United States of America as represented by the Secretary of the Army Application September 12, 1950, Serial No. 184,510

1 Claim. (Cl. 81—9.5)

(Granted under Title 35, U. S. Code (1952), sec. 266)

The invention described herein may be manufactured and used by or for the Government for governmental purposes, without the payment of any royalty thereon.

The present invention relates to a wire stripper, and more particularly to a wire stripper adapted for removing any desired length of insulation from a covered wire conductor.

Among electrical workers there is a continual need for removing the insulation from covered wire conductors where it is desired to make new electrical connections.

The removal of the insulation is usually accomplished by cutting into the insulation and removing that portion of the insulation by a pair of pliers or some other cutting tool. Other types of devices for removing insulation have been designed, incorporating in such devices a sharp cutting edge, such as a knife, which cuts the insulation and thereafter the insulation is removed by conventional means. It has been found that employment of such devices, often results in damage by cutting or marring the wire conductor.

It is, therefore, an object of the present invention to provide a stripping tool which will readily remove any length of insulation of insulated cable without the possibility of causing damage to the wire conductor.

Another object of the invention is to provide a tool which will remove the insulation in one operation, that is, that will cut the insulation and in the same operation permit ready and easy removal of the same.

Figure 1:
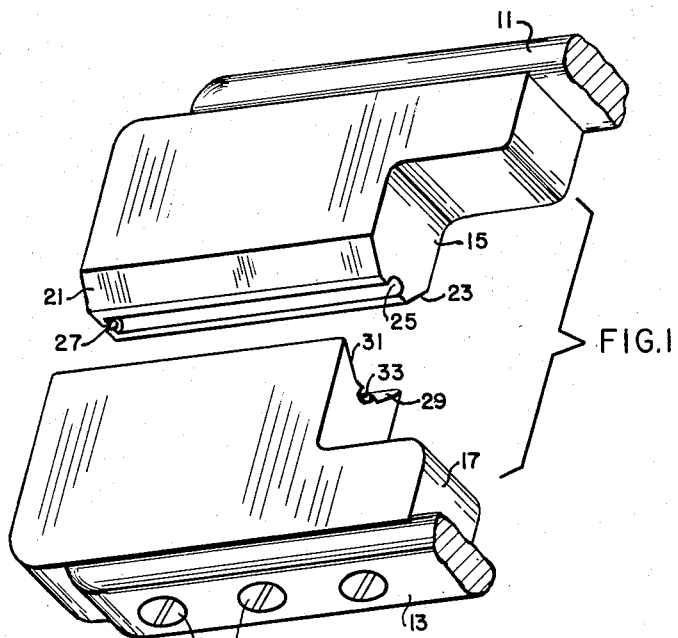

In the accompanying drawing there is shown one embodiment of the invention, wherein Figure 1 is a view in perspective of the insulation removal means mounted upon a pair of handles, or other supporting means, which are not completely shown.

Figure 2:
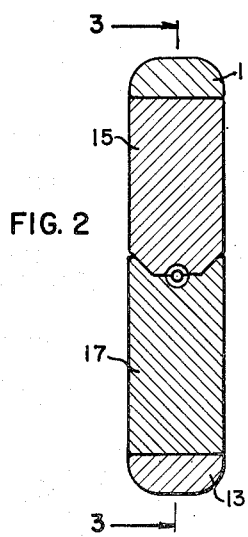
Figure 3:
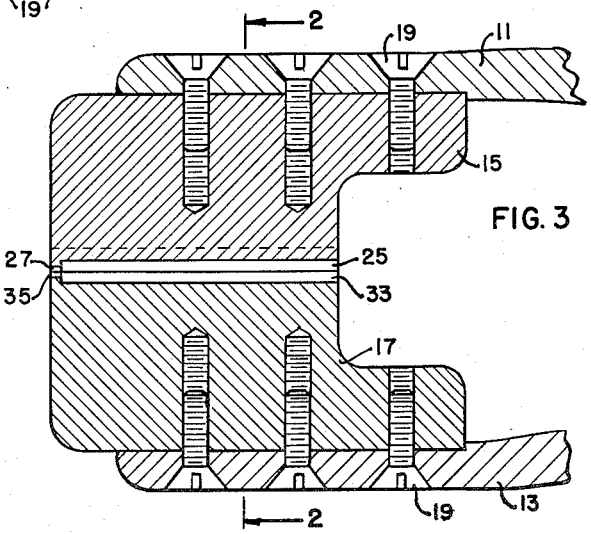

Figure 2 is a cross-sectional view of the end of the device taken on the line 2—2 of Figure 3; and, Figure 3 is a sectional view of the device taken on the line 3—3 of Figure 2.

Referring particularly to Figure 1, a pair of handles 11, 13 are shown which serve as a supporting means for the wire stripping device hereinafter more fully described. The handles 11, 13 may be the conventional crossed lever arms of a pair of pliers such as are commonly used by electricians. However, the wire stripping device may be mounted upon any pair of handles joined or linked so as to provide a supporting means for the opposing block members of the wire stripper. The wire stripper comprises essentially a pair of mutually opposing block members 15, 17; member 15 serving as a male member and block 17 serving as a female member. Screws 19 serve as a means for securing block members 15, 17 to the handles 11, 13 respectively. Block 15 is provided with chamfered surfaces 21 and 23, and a semi-circular groove 25 which extends from the inner end of the block to a point slightly short of the other end of said block, at which point a lip 27 is formed having a semi-cylindrical bore smaller than that of the groove 25. The female block member 17 is similarly provided with inwardly converging bevelled surfaces 29 and 31 which, when the wire stripping tool is in operative position, are in abuttment with the chamfered surfaces 23 and 21, respectively, of the block member 15. Block 17 is also provided with a longitudinally disposed arcuate groove 33 which is located at the base of the recess formed by the converging bevelled surfaces 29, 31. The groove 33 does not extend the full length of the block but terminates in a lip portion 35 having a semi-cylindrical bore smaller than that of groove 33.

The groove 33 and lip portion 35 of block 17 are in opposition, respectively, to groove 25 and lip 27 of block 15. Accordingly, when blocks 15 and 17 are drawn together, there is formed a cylindrical channel formed of the opposing grooves 25 and 33 and a more restricted or smaller channel formed between the opposing lip portions 27 and 35.

In operation, the cable of which the insulation is to be removed is placed between the blocks 15, 17 and the handles 11, 13 are drawn toward each other. The cable then extends between the lip portions 27, 35 and into the cylindrical channel formed by the opposing grooves 25 and 33. Slight pressure exerted upon the handles will enable the lips 27, 35 to cut the insulation, at which time the tool is pulled and effectively removes that portion of the insulation contained within the channel and any portion of the insulation extending beyond the tool.

While there has been shown in the drawing and there has been described in detail a preferred form of the invention, it will be understood that it is not thereby intended to limit it to the specific application disclosed, but it is aimed to cover all modifications and alternative constructions falling within the scope of the invention as expressed in the claim.

What is claimed is:

A stripper for removing the insulation from a covered wire conductor, comprising a pair of mutually opposing blocks, means for supporting said blocks, and means for securing said blocks to said supporting means, the sides of first of said blocks being chamfered to form a substantially triangular wedge, the second of said blocks recessed to accommodate the said triangular wedge of said first block, said first block having a longitudinally disposed groove in the vertex of said triangular wedge and terminating in a depending lip portion having an arcuate bore smaller than that of said groove, said second block having a groove in the base of said recessed portion and terminating in a depending lip portion having an arcuate bore smaller than that of said last mentioned groove, whereby when said blocks are in engagement, the grooves in said first and second blocks form a circular channel of a diameter greater than that of the circular groove formed by the opposing lip portions.

ELWOOD RENNIE.
JAMES H. HYDE,
*Executor of the last will and testament of William W. Hyde, deceased.*

References Cited in the file of this patent

UNITED STATES PATENTS

| Number | Name | Date |
|---|---|---|
| 1,019,835 | Prack | Mar. 12, 1912 |
| 1,388,398 | Adams | Aug. 23, 1921 |
| 1,578,340 | Miller | Mar. 30, 1926 |
| 1,699,805 | Ocko | Jan. 22, 1929 |